United States Patent
Hand (10) Patent No.: US 12,397,728 B2
(45) Date of Patent: Aug. 26, 2025

(54) SYSTEM AND METHOD FOR CHANGING AN APPEARANCE OF AT LEAST ONE VEHICLE

(71) Applicant: MERCEDES-BENZ GROUP AG, Stuttgart (DE)

(72) Inventor: Sabina Hand, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 252 days.

(21) Appl. No.: 18/031,983

(22) PCT Filed: Sep. 29, 2021

(86) PCT No.: PCT/EP2021/076804
§ 371 (c)(1),
(2) Date: Apr. 14, 2023

(87) PCT Pub. No.: WO2022/078761
PCT Pub. Date: Apr. 21, 2022

(65) Prior Publication Data
US 2023/0382224 A1    Nov. 30, 2023

(30) Foreign Application Priority Data
Oct. 15, 2020   (DE) ............... 10 2020 006 360.8

(51) Int. Cl.
*B60K 35/00*   (2024.01)
*B60R 16/037*   (2006.01)
(Continued)

(52) U.S. Cl.
CPC ............ *B60K 35/00* (2013.01); *B60R 16/037* (2013.01); *B60K 35/65* (2024.01); *B60K 35/85* (2024.01);
(Continued)

(58) Field of Classification Search
CPC ........ B60K 35/00; B60K 35/65; B60K 35/85; B60K 16/037; G07C 5/00
See application file for complete search history.

(56) References Cited

U.S. PATENT DOCUMENTS 10,616,218 B2 *   4/2020   Boehm ................ H04L 63/105
11,889,394 B2 *   1/2024   Penilla .................... G07F 9/001
(Continued)

FOREIGN PATENT DOCUMENTS

| CN | 105247600 A | 1/2016 |
| CN | 105579280 A | 5/2016 |

(Continued)

OTHER PUBLICATIONS

Office Action created Jun. 29, 2023 in related/corresponding DE Application No. 10 2020 006 360.8.
(Continued)

*Primary Examiner* — Tan Q Nguyen
(74) *Attorney, Agent, or Firm* — PATENT PORTFOLIO BUILDERS PLLC (57) ABSTRACT

A system for changing an appearance of a vehicle includes a vehicle and a vehicle-external server. The vehicle has a plurality of components and/or functions with changeable properties. The vehicle-external server has a user platform accessible from the vehicle and/or by a user terminal and on which an appearance can be selected from a plurality of appearances available to the vehicle. The vehicle-external server has a computing unit generating a data packet based on the selected appearance. The data packet is suitable for processing in the control unit in the vehicle to change the properties of the plurality of components and/or functions in a coordinated manner. The data packet is transmitted from the vehicle-external server to the control unit by the communication units and the control unit processes the data (Continued)

packet and adjusts the properties of the plurality of components and/or functions.

13 Claims, 4 Drawing Sheets (51) Int. Cl.
   *B60K 35/65* (2024.01)
   *B60K 35/85* (2024.01)
   *G07C 5/00* (2006.01)
(52) U.S. Cl.
   CPC .. *B60K 2360/589* (2024.01); *B60K 2360/731* (2024.01)

(56) References Cited

U.S. PATENT DOCUMENTS

| | | | |
|---|---|---|---|
| 12,118,045 B2* | 10/2024 | Ricci | H04L 63/102 |
| 2002/0091706 A1 | 7/2002 | Anderson et al. | |
| 2010/0222939 A1* | 9/2010 | Namburu | B60R 16/037 701/1 |
| 2014/0306814 A1 | 10/2014 | Ricci | |
| 2015/0148989 A1 | 5/2015 | Cooper et al. | |
| 2016/0098756 A1 | 4/2016 | Ayre | |
| 2018/0059913 A1* | 3/2018 | Penilla | H04W 12/068 |
| 2018/0097804 A1 | 4/2018 | Boehm | |
| 2020/0371755 A1 | 11/2020 | Patni et al. | |
| 2020/0391755 A1 | 12/2020 | Lerner et al. | |

FOREIGN PATENT DOCUMENTS

| | | |
|---|---|---|
| CN | 107107869 A | 8/2017 |
| CN | 110979202 B | 4/2020 |
| CN | 210793099 U | 6/2020 |
| DE | 102005034771 A1 | 5/2006 |
| DE | 112005000563 T5 | 3/2007 |
| DE | 112006000418 T5 | 1/2008 |
| DE | 102010011319 A1 | 9/2011 |
| DE | 102013016347 A1 | 4/2014 |
| DE | 102013226558 A1 | 6/2015 |
| DE | 102014222426 A1 | 5/2016 |
| DE | 102018207849 A1 | 11/2019 |
| WO | 2013130036 A1 | 9/2013 |

OTHER PUBLICATIONS

International Search Report and Written Opinion mailed Jan. 21, 2022 in related/corresponding International Application No. PCT/EP2021/076804.
Office Action dated Jun. 6, 2025 in related/corresponding EP Application No. 21787322.3.
Office Action dated Jun. 30, 2025 in related/corresponding CN Application No. 202180070691.0.

* cited by examiner

SYSTEM AND METHOD FOR CHANGING AN APPEARANCE OF AT LEAST ONE VEHICLE

BACKGROUND AND SUMMARY OF THE INVENTION

Exemplary embodiments of the invention relate to a system for changing an appearance of at least one vehicle and to a method for changing the appearance of at least one vehicle.

On demand morphable automotive body moldings and surfaces are known from the prior art, as described in DE 11 2006 000 418 T5. A morphable vehicle member comprises a portion based on non-active material coupled to a portion based on active material. The portion based on active material comprises an active material adapted to change at least one attribute in response to an activation signal, wherein the change in the at least one attribute is a change in a modulus property, in a shape orientation or in a combination of the modulus property and the shape orientation on the portion based on active material. The morphable vehicle member also comprises an activation device in operative connection with the active material which is adapted to provide the activation signal, and a controller in operative connection with the activation device.

DE 11 2005 000 563 T5 describes morphable body moldings, rubber strips and bumpers. The morphable molding comprises an active material in operative connection with a surface of the molding, wherein activation of the active material by an external stimulus serves to change the shape of the molding.

Exemplary embodiments of the invention are directed to a system for changing an appearance of at least one vehicle and a method for changing an appearance of at least one vehicle, both system and method being improved in relation to the prior art.

In a system for changing an appearance of at least one vehicle, the vehicle has a plurality of components and/or functions with changeable properties. Furthermore, the system comprises a control unit for changing the properties, and a vehicle communication unit for the at least temporary transmission of data between the vehicle and a vehicle-external server. The vehicle-external server has a server communication unit for the at least temporary transmission of data between the vehicle-external server and the vehicle and/or a user terminal.

According to the invention, the vehicle-external server is provided with a user platform that can be accessed from the vehicle and/or by means of the user terminal and on which an appearance can be selected from a plurality of appearances available to the vehicle. The vehicle-external server is provided with a computing unit for generating a data packet based on the selected appearance, wherein the data packet is suitable for processing in the control unit in the vehicle in order to change the properties of the plurality of components and/or functions in a coordinated manner. Furthermore, the data packet is transmitted from the vehicle-external server to the control unit by means of the communication units and the control unit processes the data packet and adjusts the properties of the plurality of components and/or functions.

In a method according to the invention for changing the appearance of the vehicle, in particular by means of this system, it is determined by means of a computing unit on the vehicle-external server which components and/or functions with changeable properties the vehicle has. The user is offered a choice of a plurality of appearances available for the vehicle via their user terminal. Advantageously, the user selects one of the appearances. After the user has made a selection, the data packet is created as a function of the determined components and/or functions with changeable properties of the vehicle and as a function of the appearance of the vehicle selected by the user and is transmitted from the vehicle-external server to the vehicle and processed in the control unit. For changing the properties, the components and/or functions of the vehicle are controlled, in particular coordinated with one another, by means of the control unit in order to produce the appearance of the vehicle selected by the user. Advantageously, all of the actions of the method, with the exception of the selection of the respective appearance by the user, are performed automatically and without human intervention, i.e., they are performed by the system and not by humans.

The respective appearance of the vehicle is also referred to as a skin. It advantageously comprises visually, haptically, and/or acoustically perceptible properties of the components and/or functions, in particular the look of the vehicle, in particular of an interior and/or exterior of the vehicle, the look of an environment surrounding of the vehicle which can be changed by the vehicle, in particular by means of light radiation, a haptically perceptible design of the vehicle, in particular of the interior and/or exterior of the vehicle, and/or noises and/or sounds, generally referred to as sound. This also includes, for example, music played by an audio playback device of the vehicle. In particular, the respective appearance represents a design theme. It thus advantageously comprises a plurality of components and/or functions, the properties of which are coordinated with each other according to the respective appearance, in order to thus create the uniform appearance in combination with each other according to the respective theme.

The vehicle-external server is also referred to as a back-end. In particular, this is a central server or a central server system of a manufacturer of the at least one vehicle.

The data transmission connection between the vehicle and the vehicle-external server, or the vehicle communication unit and the server communication unit, is a wireless data transmission connection, in particular a radio connection. The data, in particular of the data packet, is thus transmitted over the air. The data packet can be transmitted in this case directly between server communication unit and vehicle communication unit or indirectly via another system.

The computing unit comprises, in particular, a computer-assisted analysis program, i.e., a corresponding computer program, on the vehicle-external server. Information for determining which components and/or functions with changeable properties the vehicle has can be obtained, for example, by the vehicle-external server accessing the vehicle, for example accessing control units of the components and/or functions and/or the components and/or functions themselves, with the required information being read out as a result of this access by the server, in particular by the access of the computing unit, and/or this information can, for example, already be stored on the server, in particular by the vehicle manufacturer, and be retrievable by the computing unit, for example by inputting a unique identification of the vehicle, for example a vehicle identification number. This input can be done by the user, for example.

By means of the computing unit, it is thus determined, in particular, which hardware is available in the vehicle in the form of the components and/or functions with changeable properties, and the coordinated data packet for this software already present in the vehicle is compiled. The content of the data packet depends, in particular, on the selected appearance of the vehicle and the hardware present in the vehicle. The data packet is then used for processing in the control unit and for controlling the individual actuators and functions in the vehicle, whereby this control is in particular coordinated, also referred to as orchestration.

The user platform is, in particular, a digital service platform for the users, in particular an area of the server intended for communication with the users, i.e., which the users can access, on which the possible appearances for their vehicle and, advantageously, also the components and/or functions with changeable properties suitable for this are presented to them, and on which they can select a respective appearance for their vehicle and, for example, also the components and/or functions which are to be changed accordingly for this. The respective user can choose a suitable configuration (expansion levels) of the appearance, expediently depending on the available software and thus depending on the components and/or functions with changeable properties which are present in the vehicle. For example, the user can first select a basic theme of the respective appearance and then select how many and/or which components and/or functions with changeable properties of their vehicle are to be affected, i.e., change their respective property for this appearance. This selection can be made individually by the user, for example, or the user is offered a choice of several equipment levels, for example from a basic level with a few affected components and/or functions to a full equipment level with all components and/or functions with changeable properties available in the vehicle for the appearance. The basic level comprises, for example, interior lighting of the vehicle adapted to the selected appearance, while the full equipment level also comprises, for example, morphable components of the vehicle that are adapted to the respectively selected appearance. For example, it can also be provided that an extension to further changed properties to an already acquired appearance from a collection can be selected from this collection. Furthermore, specific services can be offered that are linked to a certain collection. These could be certain offers from collaboration partners such as hotels, restaurants, jewelers, or similar services.

The user advantageously purchases the respective appearance. The price depends, for example, on the respectively selected expansion level of the appearance. For example, it can be provided that appearances already purchased by the user and/or changed properties of the components and/or functions can be updated by the manufacturer of the vehicle during an entire product life cycle of the vehicle.

Via the user platform, the user can, for example, also be shown further information, in particular regarding the respective appearance, for example background information on artists and/or designers who have created the respective appearance, and/or information on the sustainability and/or editions of the respective appearance. In addition to the described function of purchasing the respective appearance, which thus comprises, for example, an electronic shop, the user platform can, for example, comprise an auction house function, an event planner function, and/or a chat function. For example, the user can enter into communication with the vehicle manufacturer and/or with other users via the chat function. The appearances acquired by the user can also be sold to other users or exchanged with other users, for example via the auction house function. This means that the appearances can be traded on the user platform, in particular between different users, for example independently of vehicle ownership.

The user terminal, by means of which the respective user can access this user platform is, for example, a mobile phone, in particular a smartphone, a computer, for example a portable computer, for example a tablet computer. This user terminal can be, for example, a vehicle-external user terminal, a user terminal fixedly connected to the vehicle, for example an input and output unit of the vehicle, or a user terminal connectable to the vehicle. A connection, in particular a data transmission connection, of the user terminal to the user platform on the vehicle-external server can be, for example, a wired or wireless connection or a combination of wired or wireless connection. For example, this connection is an internet connection.

In addition to the described connection to the user platform with the aid of the user terminal, it is alternatively or additionally possible for the user to access the platform directly from their vehicle.

The data packet can be created, for example, according to the respectively selected appearance of the vehicle and then transmitted from the server via the communication units to the vehicle.

The data packet is, for example, an individual piece of software for the respective vehicle and the respectively selected appearance. This software is then transmitted to the vehicle. If several vehicles have the same components and/or functions with changeable properties and if the same appearance is selected for these vehicles, then the same software is advantageously used for these vehicles.

Alternatively, it can be provided, for example, that the software for the respective appearance is already present in the vehicle. In this case, the activation code for the software of the respectively selected appearance is advantageously created as a data packet and then transmitted from the server via the communication units to the vehicle, whereby the software for the respectively selected appearance is then activated by means of the activation code. This activation code is, for example, an individual activation code for the respective vehicle and the respectively selected appearance.

Another alternative is to transmit a parameter set as a data packet for processing in at least one software module in the control unit. In this way, the software for changing the component or functional properties is in principle already available in the vehicle or in the control unit and is then individually parameterized by the transmitted data packet in order to adjust the desired properties.

The solution according to the invention supports, in particular, the efforts of vehicle manufacturers to reduce the number of variants in vehicle production, since fewer vehicle variants can reduce costs and improve environmental protection. At the same time, vehicle manufacturers strive to fulfil as many individual customer wishes as possible i.e., to enable each user to have their own individually configured vehicle. However, these two objectives have been contradictory up to now. The solution according to the invention achieves a reduction in the number of variants in the production of the vehicle and yet, due to the possibility of changing the appearance of the already finished vehicle, a wide range of variants is provided. In particular, the solution according to the invention makes it possible to have a wealth of variants in the same vehicle, so that if the user wishes to have a different variant of their vehicle, this can also be carried out on a vehicle already in their possession by changing its appearance.

In particular, the solution according to the invention enables the creation of new products for already existing vehicle series and also for vehicles already supplied to users. Thus, despite a reduction in variants, an upgrade of an existing product portfolio of the vehicle manufacturer is possible. Furthermore, the solution described can improve customer loyalty and open up new target consumer groups and markets.

The respective appearance, which can be selected in the described manner and then generated on the vehicle, is advantageously a rare digital physical artwork. The respective appearance is thereby created, for example, by means of digital products and/or physical components that can change their appearance, for example, by means of morphing and/or transformable properties. This artwork is then exclusively designed for a particular appearance and is available in, for example, a limited edition.

By way of example, the components and/or functions of the vehicle with changeable properties are:
- at least one interior light,
- at least one headlight, advantageously both headlights,
- at least one changeable film,
- at least one roof liner or a sunroof with lighting elements,
- at least one vehicle seat, advantageously a plurality of or all vehicle seats,
- at least one headrest, advantageously a plurality of or all headrests,
- at least one region of an outer skin, advantageously a plurality of regions,
- at least one door sill, advantageously all door sills,
- at least one external lighting projection,
- at least one hologram in the interior of the vehicle,
- at least one morphable component, advantageously a plurality of such components,
- at least one electronic paper,
- at least one display in an interior of the vehicle,
- at least one sound playback system,
- at least one decorative component,
- at least one rim, in particular at least one rim ring, advantageously a plurality of or all rims, in particular rim rings,
- at least one manufacturer's emblem, advantageously a plurality of manufacturer's emblems, for example in both the front and rear region,
- a radiator grille,
- a radiator grille light,
- a front splitter,
- a front panel,
- a rear panel,
- at least one wing mirror, in particular at least one wing mirror cover, advantageously both wing mirrors, in particular both wing mirror covers,
- at least one side skirt, advantageously both side skirts,
- at least one vehicle front component,
- at least one vehicle rear component,
- at least one vehicle side component.
- at least one aerodynamic component,
- at least one tail-light, advantageously a plurality of or all tail-lights,
- at least one, in particular physical or virtual, control element, advantageously a plurality of or all control elements,
- a dashboard,
- ambient lighting,
- at least one footwell light, advantageously a plurality of or all footwell lights,
- a windscreen,
- a steering wheel,
- at least one air intake, in particular at least one air intake frame, advantageously a plurality of air intakes, in particular air intake frames, and/or
- at least one virtual artwork.

This enables a multitude of different appearances and thus a highly customized adaptation of the vehicle to the user's wishes. The change of the properties is coordinated and designed in such a way that an appearance is an overall concept consisting of the different components of external appearance, acoustics, light, sound, and scent.

The changeable property of the at least one vehicle seat is, for example, a width and/or a length of the vehicle seat. The change of the width as well as the length has a favorable effect on the appearance of the vehicle and additionally, for example, on usage properties of the vehicle seat.

For example, the change in external appearance comprises at least one constant change and/or at least one dynamic change. The constant change is thus static, i.e., a change occurs once and is then maintained. The dynamic change is an ongoing process of change over time and ideally occurs in a coordinated manner.

The at least one constant change comprises, for example,
- a change in a shape, surface structure, and/or color of at least one component or a plurality of components,
- a projection of a logo, image, and/or video onto a roadway in the vicinity of the vehicle, and/or
- a change in a shape, and/or softness of the at least one vehicle seat or of the plurality of or all vehicle seats.

The at least one dynamic change comprises, for example,
- a reproduction of a variable content on the at least one electronic paper,
- a reproduction of motifs on at least one display unit of the vehicle,
- a sequence of a welcome ritual to welcome the user by the vehicle,
- a change of a headlight,
- a reproduction of pulsating or other dynamic light sequences,
- change of interior lighting, in particular ambient lighting, in particular in combination with sound playback.

These dynamic and constant changes, especially their possible combinations, make a multitude of different appearances possible.

BRIEF DESCRIPTION OF THE DRAWING FIGURES

Exemplary embodiments of the invention are explained in more detail below on the basis of drawings, in which:

FIG. 1 schematically shows levels of a system for changing an appearance of at least one vehicle, FIG. 2 schematically shows an external view of a vehicle, FIG. 3 schematically shows an internal view of a vehicle, FIG. 4 schematically shows a component with changeable properties, FIG. 5 schematically shows a sectional illustration of the component from FIG. 4, FIG. 6 schematically shows a detailed view of the detail excerpt VI in FIG. 5, FIG. 7 schematically shows a structure generated by means of the component from FIGS. 4 to 6, FIG. 8 schematically shows an embodiment of a seat part of a vehicle seat in a retracted state, FIG. 9 schematically shows the embodiment of the seat part as per FIG. 8 in an expanded state, FIG. 10 schematically shows a further embodiment of a seat part of a vehicle seat in a retracted state, FIG. 11 schematically shows the embodiment of the seat part as per FIG. 10 in an expanded state, and FIG. 12 schematically shows a display of a user platform on a user terminal.

Corresponding parts are provided with the same reference signs in all figures.

DETAILED DESCRIPTION

Figure 1:
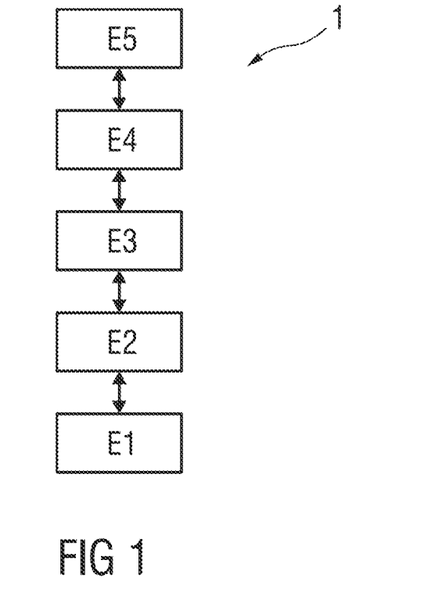

FIG. 1 schematically shows levels E1 to E5 of a system 1 for changing an appearance of at least one vehicle 2. In this system 1, the vehicle 2 has a plurality of components and/or functions with changeable properties, and a control unit 35 is provided in the vehicle 2 for changing the properties. Furthermore, a vehicle-external server 34 is provided. This contains a server communication unit 37, so that at least temporarily there is a data transmission connection between the vehicle-external server 34 and the vehicle 2, which in turn has a vehicle communication unit 36. Via this data transmission connection, a data packet can be transmitted from the server 34 to the vehicle 2, which is suitable for being processed in the control unit 35 so that the latter can carry out the corresponding change to the properties.

The data packet is, for example, special software individually compiled on the server 34. Alternatively, the software can already be present in the control unit 35 and the data packet is implemented as an activation code for activating the software or a parameter set for parameterizing a software module in the control unit 35.

In addition, a computing unit 38 is provided on the vehicle-external server 34, by means of which it is possible to determine which components and/or functions with changeable properties the vehicle 2 has, it being possible to generate the data packet as a function of the determined components and/or functions with changeable properties of the vehicle 2 and as a function of the appearance of the vehicle 2 selected by a user.

Furthermore, the vehicle-external server 34 is provided with a user platform that can be accessed by means of the user terminal 3 and/or from the vehicle 2 and on which an appearance can be selected from a plurality of appearances available to the vehicle 2.

In the system 1 described here, the vehicle 2 with the plurality of components and/or functions with changeable properties, which thus represents a physical product, forms a first level E1. A second level E2 arranged above it is formed by the vehicle-internal control unit 35. A third level E3 arranged thereabove is formed by the data transmission connection between the vehicle 2 and the vehicle-external server 34, in particular for transmitting the data packet from the vehicle-external server 34 to the vehicle 2. This data transmission connection is made by means of the vehicle communication unit 36 and the server communication unit 37. This third level E3 is thus a connectivity level.

A fourth level E4 arranged thereabove is formed by the computing unit 38 in the server 34. A fifth level E5 above this is formed by the user platform. The fifth level E5 is thus a digital service level. The first two levels E1, E2, i.e., the vehicle 2 with the plurality of components and/or functions with changeable properties and the control unit 35 with vehicle-internal actuators, belong to the physical world, the last two levels E4, E5, i.e., the computing unit 38 and the user platform, belong to the digital world. The middle level E3, i.e., the connectivity level with the data transmission connection between the vehicle 2 and the vehicle-external server 34, forms the connection between the physical world and the digital world.

In a method for changing the appearance of the vehicle 2, in particular by means of this system 1, the computing unit 38 on the vehicle-external server 34 determines which components and/or functions with changeable properties the vehicle 2 has. The user is offered a plurality of available appearances for the vehicle 2 for selection via their user terminal. Advantageously, the user selects one of the appearances. Once the user has made the selection, the data packet, which can consist of software, an activation code or parameters for the software as described above, is created as a function of the determined components and/or functions with changeable properties of the vehicle 2 selected by the user and is transmitted to the vehicle 2 via the data transmission connection from the vehicle-external server 34 to the vehicle 2. By means of the data packet, the components and/or functions of the vehicle 2 are controlled by the control unit 35 for changing the properties, in particular in coordination with each other, in order to create the appearance of the vehicle 2 selected by the user. The user themselves selects which components of the appearance they want to provide for their vehicle 2 at a particular time. Advantageously, all of the actions of the method, with the exception of the selection of the respective appearance by the user, are performed automatically and without human intervention, i.e., they are performed by the system 1 and not by humans.

The respective appearance of the vehicle 2 is also referred to as a skin. It advantageously comprises visually, haptically, and/or acoustically perceptible properties of the components and/or functions, in particular the look of the vehicle 2, in particular of an interior and/or exterior of the vehicle 2, the look of an environment surrounding of the vehicle 2 that can be changed by the vehicle 2, in particular by means of light radiation, a haptically perceptible design of the vehicle 2, in particular of the interior and/or exterior of the vehicle 2, and/or noises and/or sounds, generally referred to as sound. This also includes, for example, music played by an audio playback device of the vehicle 2. In particular, the respective appearance represents a design theme. It thus advantageously comprises a plurality of components and/or functions, the properties of which are coordinated with each other according to the respective appearance, in order to thus create a uniform appearance in combination with each other according to the respective theme.

The vehicle-external server 34 is also referred to as a backend. In particular, this is a central server or a central server system of a manufacturer of the at least one vehicle 2.

The data is transmitted between the vehicle 2 and the vehicle-external server 34 via, in particular, a wireless data transmission connection, in particular a radio connection. It is thus transmitted via the two communication units 36, 37. The data of the data packet, in particular the software or the activation code or the parameterization, is thus transmitted over the air. This is possible during the entire life cycle of the vehicle 2.

A computer-assisted analysis program, i.e., a corresponding computer program, is run in particular on the computing unit 38 on the vehicle-external server 34. Information for determining which components and/or functions with changeable properties the vehicle 2 has can be obtained, for example, by the vehicle-external server 34 accessing the vehicle 2 via the server communication unit 37, in particular the computing unit 38, for example accessing control units of the components and/or functions and/or the components and/or functions themselves, with the required information being read out as a result of this access by the server 34, in particular by the access of the computing unit 38, and/or this information can, for example, already be stored on the server

34, in particular by the vehicle manufacturer, and be retrievable by the computing unit 38, for example by inputting a unique identification of the vehicle 2, for example a vehicle identification number. This input can be done by the user, for example.

By means of the computing unit 38, it is thus determined, in particular, which hardware is available in the vehicle 2 in the form of the components and/or functions with changeable properties, and the coordinated data packet in the form of software, parameters or an activation code for this software already present in the vehicle 2 is compiled. The content of the data packet depends, in particular, on the respectively selected appearance of the vehicle 2 and the hardware present in the vehicle 2. The data packet is processed in the control unit 35 and then serves for controlling the individual components via actuators or the individual functions, whereby this control is in particular coordinated, also referred to as orchestration.

The user platform is, in particular, a digital service platform for the users, in particular an area of the server 34 that is intended for communication with the users, i.e., which the users can access, on which the possible appearances for their vehicle 2 and, advantageously, also the components and/or functions with changeable properties suitable for this are presented to them, and on which they can select a respective appearance for their vehicle 2 and, for example, also the components and/or functions that are to be changed accordingly for this. The respective user can choose a suitable configuration (expansion level) of the appearance, expediently depending on the available software and thus depending on the components and/or functions with changeable properties present in the vehicle 2. For example, the user can first select a basic theme of the respective appearance and then select how many and/or which components and/or functions with changeable properties of their vehicle 2 are to be affected, i.e., change their respective property for this appearance. The user can individually make this selection, for example, or the user is offered a choice of several expansion levels, for example from a basic level with a few affected components and/or functions to a full equipment level with all components and/or functions with changeable properties available in the vehicle 2 for the appearance. The basic level comprises, for example, interior lighting of the vehicle 2 correspondingly adapted to the selected appearance, while the full equipment level also comprises, for example, morphable components of the vehicle 2 which are adapted to the respective selected appearance. For example, it can also be provided that an extension to further changed properties to an already acquired appearance from a collection can be selected from this collection.

The user advantageously purchases the respective appearance. The price depends, for example, on the respectively selected expansion level of the appearance. For example, it can be provided that appearances already purchased by the user and/or changed properties of the components and/or functions can be updated by the manufacturer of the vehicle 2 during an entire product life cycle of the vehicle 2.

Via the user platform, the user can, for example, also be shown further information, in particular regarding the respective appearance, for example background information on artists and/or designers who have created the respective appearance, and/or information on the sustainability and/or editions of the respective appearance. In addition, information such as the current market value of the respective appearance can be displayed. Then the respective appearance could also be resold directly.

In addition to the described function of purchasing the respective appearance, which thus comprises, for example, an electronic shop, the user platform can, for example, comprise an auction house function, an event planner function, and/or a chat function. For example, the user can enter into communication with the vehicle manufacturer and/or with other users via the chat function. The appearances acquired by the user can also be sold to other users or exchanged with other users, for example via the auction house function. This means that the appearances can be traded on the user platform for example, in particular between different users, for example also independently of vehicle ownership. The user platform thus offers the functionality of a shop, a trading platform, and a communication platform at the same time.

The user platform offers a user the possibility, on the one hand, to create their own profile in which they can manage their personal data as well as their vehicle data. In addition, they can use the platform as a digital store for items they have already purchased. An important component is the shop, in which the user is offered the appearances available for their vehicle with an overview of which components, functions, or other collector's items can be acquired for this appearance, whereby this selection depends on which vehicle they own.

One example of such an appearance is the "Yoga" skin. This comprises a variety of different features, ranging from harmonized ambient lighting, a welcome light, a projection of a mandala symbol into the vehicle footwell or onto the floor in the vicinity of the vehicle 2 and relaxation music to a tactile, raised figure displayed on the center console by means of a morphing surface.

The user selects the individual components of this skin that are of interest to them and the data packet is compiled and sent accordingly, as described above. At a later point in time, the user can expand or complete the skin by purchasing further components of the skin. In addition, the user can resell the skin via the trading platform. The value of the respective skin can also change depending on the vehicle usage behavior, for example it can increase due to an environmentally-friendly driving style, countries visited frequently, services used or similar. Several skins can be purchased so that the user can switch between different skins in their vehicle during operation and thus completely change the appearance of the vehicle at the touch of a button.

As a further component, the platform can be used as a communication platform to obtain information about the various appearances as well as to exchange these with other users. The vehicle user can also make their skin-enabled vehicle 2 available on the platform for previews or exhibitions.

The user terminal 3 by means of which the respective user can access this user platform is, for example, a mobile phone, in particular a smartphone, a computer, for example a portable computer, for example a tablet computer. This user terminal 3 can be, for example, a vehicle-external user terminal 3, a user terminal 3 fixedly connected to the vehicle 2, for example an input and output unit of the vehicle 2, or a user terminal 3 that can be connected to the vehicle 2 and removed therefrom again. A connection, in particular a data transmission connection, of the user terminal 3 to the user platform on the vehicle-external server 34 can be, for example, a wired or wireless connection or a combination of wired or wireless connection. For example, this connection is an internet connection.

The data packet can, for example, be created according to the respectively selected appearance of the vehicle 2 and then transmitted from the server 34 via the communication units 36, 37 to the vehicle 2. The data packet is, for example, an individual piece of software for the respective vehicle 2 and the respectively selected appearance. An individual, unique data packet is thus generated for each individual vehicle 2.

Alternatively, it can be provided, for example, that the software for the respective appearance is already present in the vehicle 2. In this case, the activation code for the software of the respectively selected appearance is advantageously created as a data packet and then transmitted from the server 34 via the data transmission connection to the vehicle 2, whereby the software for the respectively selected appearance is then activated by means of this activation code. This activation code is, for example, an individual activation code for the respective vehicle 2 and the respectively selected appearance. Alternatively, the data packet can also be a parameter set for software modules already present in the vehicle 2 in the control unit 35.

Figure 2:
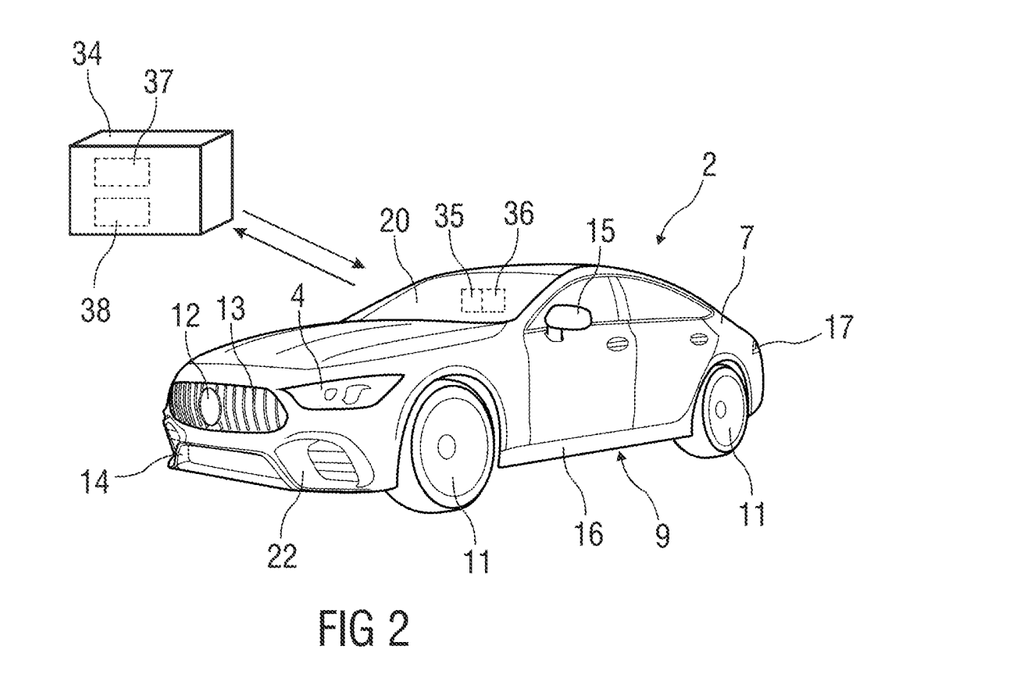
Figure 3:
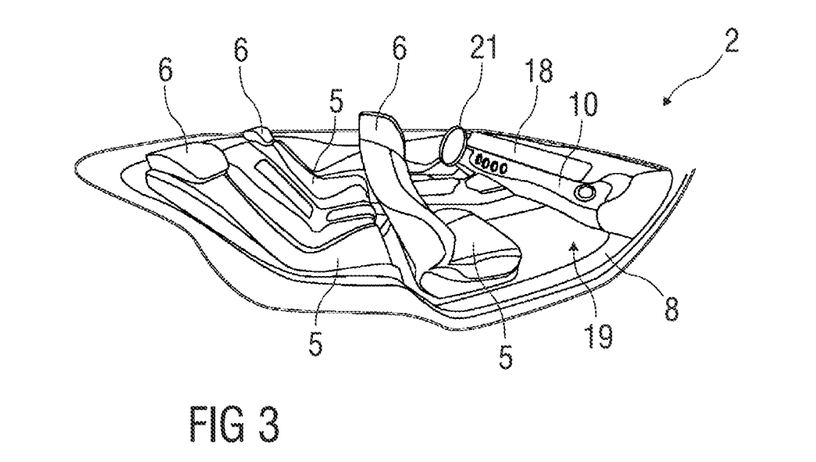

FIG. 2 schematically shows an external view and FIG. 3 schematically shows an internal view of the vehicle 2.

The components and/or functions of the vehicle 2 with changeable properties are, for example,

- at least one interior light,
- at least one headlight 4, advantageously both headlights 4,
- at least one changeable film, for example changeable in terms of color and/or transparency/translucency,
- at least one roof liner or a sunroof with lighting elements,
- at least one vehicle seat 5, advantageously a plurality of or all vehicle seats 5,
- at least one headrest 6, advantageously a plurality of or all headrests 6,
- at least one region of an outer skin 7, advantageously a plurality of regions,
- at least one door sill 8, advantageously all door sills 8,
- at least one external lighting projection 9, for example under the vehicle 2 and/or in front of the vehicle 2 and/or behind the vehicle 2 and/or to the side of the vehicle 2,
- at least one hologram in the interior of the vehicle 2,
- at least one morphable component, advantageously a plurality of such components,
- at least one electronic paper, also referred to as E-ink film,
- at least one display in the interior of the vehicle,
- at least one sound playback system,
- at least one decorative component 10,
- at least one rim 11, in particular at least one rim ring, advantageously a plurality of or all rims 11, in particular rim rings,
- at least one manufacturer's emblem 12, advantageously a plurality of manufacturer's emblems 12, for example in both the front and rear region,
- a radiator grille 13,
- a radiator grille light,
- a front splitter 14,
- a front panel,
- a rear panel,
- at least one wing mirror 15, in particular at least one wing mirror cover, advantageously both wing mirrors 15, in particular both wing mirror covers,
- at least one side skirt 16, advantageously both side skirts 16,
- at least one vehicle front component,
- at least one vehicle rear component,
- at least one vehicle side component.
- at least one aerodynamic component, in particular so-called flaps,
- at least one tail-light 17, advantageously a plurality of or all tail-lights 17,
- at least one, in particular physical or virtual, control element, advantageously a plurality of or all control elements,
- a dashboard 18,
- at least one footwell light 19, advantageously a plurality of or all footwell lights 19, for example by means of micro-LED,
- ambient lighting,
- a windscreen 20,
- a steering wheel 21,
- at least one air intake, in particular at least one air intake frame 22, advantageously a plurality of air intakes, in particular air intake frames 22, and/or
- at least one virtual artwork.

The respective headlight 4, in particular a light emitted by it, can, for example, be changed in terms of its shape and/or color, for example by means of a matrix light in the headlight and/or by means of OLED. For reasons of road safety in particular, this change is expediently only made when the vehicle 2 is stationary.

The respective wing mirror 15, in particular its mirror cover, can, for example, be changed by means of an electronic paper arranged thereon, in particular enabling the reproduction of color images.

The rear region of the vehicle 2 can, for example, be changed by a structural change. This can, for example, affect the rear panel and/or one or more vehicle rear components. In addition to changing the structure, it is possible to change the visual appearance.

The respective tail-light 17, in particular a light emitted by it, can be changed, for example, in terms of its shape and/or color, for example by means of a matrix light in the tail-light 17. For reasons of road safety in particular, this change is expediently only made when the vehicle 2 is stationary.

The respective rim 11, in particular its rim ring, can be changed, for example, by means of an electronic paper arranged thereon, in particular its color can be changed. Alternatively, or additionally, wheel housing lighting can be provided, which enables light staging of the wheels that can be changed in terms of time and color.

The external light projection 9 can be designed as a static or fully dynamic projection, for example by means of a microlens array.

The respective side skirt 16 can, for example, be made of textile material with an auxetic structure and/or have lighting, for example LED lighting.

The air intake frame 22, also referred to as a vent frame, can, for example, be changed by means of an electronic paper arranged thereon, in particular its color can be changed.

The front splitter 14 can, for example, be changed by means of an electronic paper arranged thereon, in particular its color can be changed.

The structure or the visual appearance of the radiator grille 13 can, for example, be changed. Displays or electronic paper can be used here to display different motifs on the radiator grille.

The color of the manufacturer's emblem 12 can, for example, be changed, by means of LED lighting for example.

The respective control element can, for example, be changed by means of at least one magnetorheological and/or electrorheological fluid and/or electromagnetic taxels.

The windscreen 20 and/or the respective virtual control element can, for example, be changed by means of mixed reality, in particular by means of augmented reality, and/or by means of virtual reality.

The dashboard 18 can, for example, be changed by means of an electronic paper arranged thereon, by means of at least one microfluid and/or by means of a display with a wooden appearance, for example a display covered with a translucent wooden layer. Alternatively, decorative trim pieces with electromagnetic taxels, an array of small tactile studs that can be individually controlled, can be used.

The respective headrest 6 can, for example, have at least one electroactive polymer and/or at least one ferrofluid and be changed thereby.

The at least one vehicle seat 5 can, for example, have at least one auxetic foam and/or at least one tactile matrix and/or at least one electroactive polymer, and can be changed thereby.

The steering wheel 21 can, for example, have at least one shape memory material alloy and can by changed thereby.

One or a plurality of control elements of the vehicle 2 can each be configured, for example, as morphable components.

The respective decorative component 10 can, for example, be changed by means of an electronic paper arranged thereon, by means of a display with a wooden appearance, for example a display covered with a translucent wooden layer, by means of at least one ferrofluid, by means of at least one microfluid, by means of arrays of controllable tactile studs, and/or by means of auxetic polymer molecules.

Other components of the vehicle 2, for example exterior components and/or interior components, for example an A-pillar and/or aerodynamic components, in particular so-called flaps, and/or a footwell trim, can also have electronic paper, as a result of which their color can be changed, for example. Furthermore, display units can be arranged, for example, on the outer skin 7 and/or on the exterior paneling and/or in the interior, in particular on an interior paneling or on a pillar, in order to thereby achieve, for example, a color change and/or to display a virtual artwork thereon. These display units can also be made of electronic paper or displays or their reflection.

The changeability of the respective component can be achieved, for example, by means of at least one ferromagnetic fluid, by means of at least one magnetorheological and/or electrorheological fluid, by means of auxetic structures, by means of electronic paper, by means of morphing mechanisms, by means of textiles, for example by means of a textile outer skin 7, and/or by means of projections, mini-LED, OLED and/or AMOLED.

Electronic paper, also referred to as E-ink, for example in the form of a film, is a passive, non-luminous display that is usually based on the principle of electrophoresis. For example, the component has a surface area on which the electronic paper is arranged, so that this surface area is designed as a reflective, passive display area, which enables, for example, a color change of the component in this surface area.

If the respective rim 11 has such an electronic paper, an optical appearance on the rim 11 can also be changed. The electronic paper forms a display device arranged on the rim 11, preferably as a rim ring or on the rim ring.

The electronic paper can, for example, be designed to display a specific color when an electrical voltage is applied as a function of the electrical voltage. The electronic paper is advantageously connected to a control device, in the case of the rim 11 for example to a tire pressure control system, for providing and controlling the electrical voltage as a function of the color to be displayed, in particular by means of an electrical connection.

The electronic paper, in particular in the form of a film, is for example particularly advantageously suitable for covering large flat components of the vehicle 2, in particular in the exterior, i.e., on an outside of the vehicle 2, for example it is arranged on one or more vehicle doors and/or on a tailgate and/or on an engine bonnet and/or on mudguards and/or on a vehicle roof and/or on one or more A-pillars, B-pillars, C-pillars and/or D-pillars of the vehicle 2. Furthermore, a layer of a transparent material, for example glass, can be placed over the E-ink film to improve the appearance and the robustness of the component.

As an alternative to electronic paper, reflective LCD displays can also be used. These are LCD displays with an optical layer that both transmits and reflects light. When exposed to light, the display appears more reflective, while in the dark it is illuminated by a light placed behind it.

For example, the change in external appearance comprises at least one constant change and/or at least one dynamic change. The constant change is thus static, i.e., a change occurs once and is then maintained. The dynamic change is an ongoing process of change over time.

By way of example, the at least one constant change comprises:
 a change in a shape, surface structure, and/or color of at least one component or a plurality of components,
 a projection of a logo, image, and/or video onto a roadway in the vicinity of the vehicle 2, and/or
 a change in a shape and/or softness of the at least one vehicle seat 5 or of the plurality of or all vehicle seats 5.

By way of example, the at least one dynamic change comprises:
 a reproduction of a variable content on the at least one electronic paper,
 a reproduction of motifs on at least one display unit of the vehicle 2,
 a sequence of a welcome ritual to welcome the user by the vehicle 2,
 a change of a headlight,
 reproduction of pulsating or other dynamic light sequences,
 change of the interior lighting, in particular ambient lighting, in particular in combination with sound reproduction,
 the reproduction of noises in the outer region of the vehicle 2,
 the reproduction or presentation of virtual figures and/or three-dimensional objects in the interior of the vehicle with the aid of augmented reality.

Figure 4:
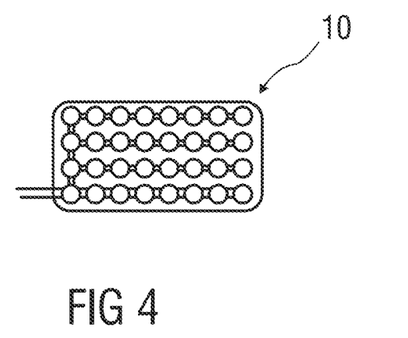
Figure 5:
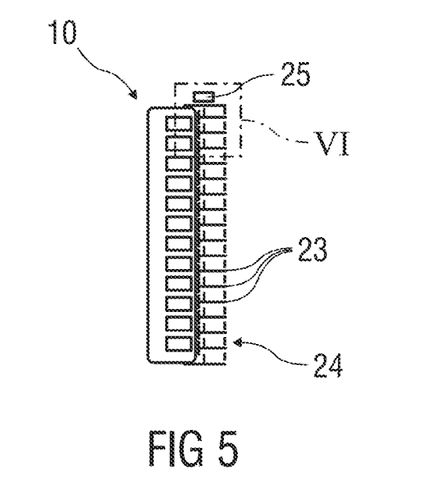
Figure 6:
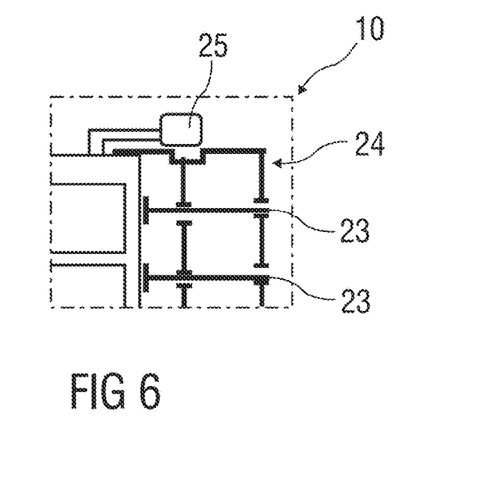
Figure 7:
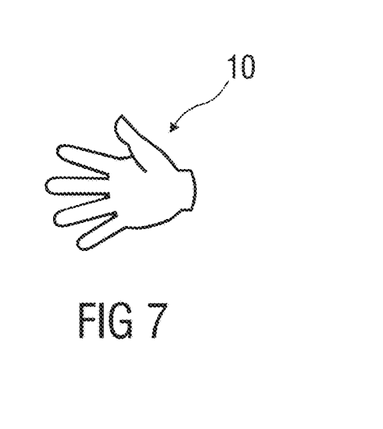

FIGS. 4 to 7 show an example of a component, in particular a vehicle component, with changeable properties, with FIG. 4 showing a front view of the component, FIG. 5 a sectional illustration of the component, FIG. 6 a detailed view of the component according to the detail excerpt VI in FIG. 5, and FIG. 7 a surface structure of this component generated by means of the component. The component is, for example, a decorative component 10 of the vehicle 2. The component shown here is designed as a switchable bed of nails decorative component. It has needles 23 made of a magnetic material arranged in a plane, which are mounted in a grid structure 24, which inhibits movement in a normal position and can release the movement of the needles 23 via an actuator 25. An arrangement of further actuators, preferably electromagnets, can be used to move, for example attract, the released needles 23. Alternatively, the needles 23 can be repelled by means of these electromagnets, in particular the needles 23 located in the direct vicinity of the respective electromagnet. The actuator 25 and/or the other actuators advantageously form the actuator of this component. When the other actuators are controlled individually, as shown by way of example in FIG. 7, any desired representations can be created that behave like a bed of needles. In this way, different scenes and representations can be created that allow a very high level of detail depending on the number of individual controlled electromagnets.

Another way to change the properties of a component is, for example, consists in the component, for example the decorative component 10, comprising at least one electromagnet, a magnetic fluid, and a control device, wherein the magnetic fluid is arranged in a closed container. The at least one electromagnet is arranged relative to the magnetic fluid in such a way that the magnetic fluid can be magnetically influenced by the at least one electromagnet. The control device is operatively connected to the at least one electromagnet and is set up to generate and/or to bring about a structure in the magnetic fluid by controlling the at least one electromagnet.

Figure 8:
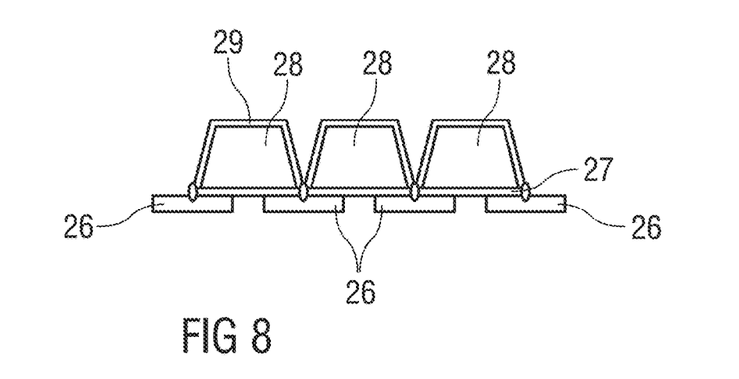
Figure 9:
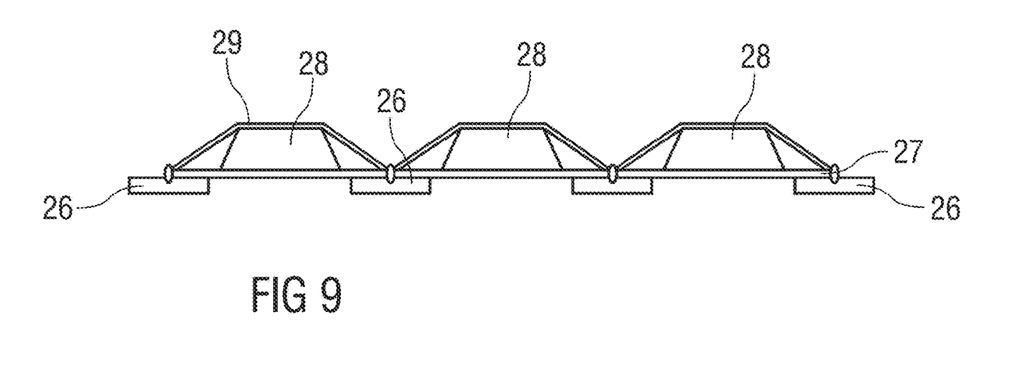
Figure 10:
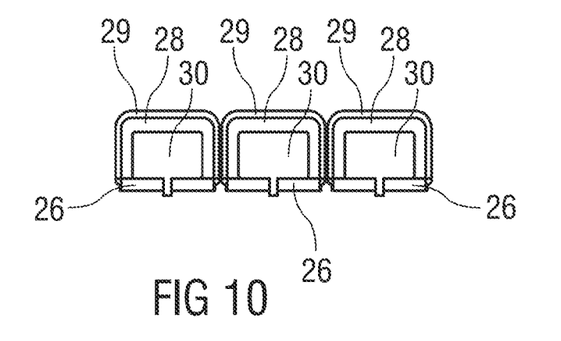
Figure 11:
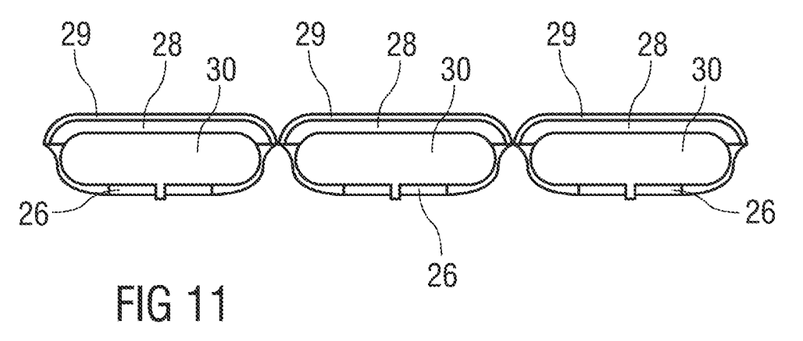

The above-described changeable property of the at least one vehicle seat 5 is, for example, a width and/or a length of the vehicle seat 5, as exemplarily shown in FIGS. 8 and 9 as well as 10 and 11 by means of two exemplary embodiments, wherein FIGS. 8 and 10 show the respective embodiment of the vehicle seat 5 in a retracted state and FIGS. 9 and 11 show the respective embodiment of the vehicle seat 5 in an expanded state. The change in width has a beneficial effect on the appearance of the vehicle 5 and additionally, for example, on the usage characteristics of the vehicle seat 5. The seat is adjusted in the examples shown by means of a comb-like principle.

In the first exemplary embodiment according to FIGS. 8 and 9, the vehicle seat 5 has rigid support plates 26 that can be moved relative to each other, in particular pushed together and pushed apart. A flexible support structure 27 is arranged on these rigid support plates 26, which expands when the rigid support plates 26 are pushed apart and contracts again when the rigid support plates 26 are pushed together. A plurality of foam elements 28 are arranged on the flexible support structure 27, which are covered with an upholstery fabric 29 that is connected to the flexible support structure 27 between the foam elements 28 in the region of the rigid support plates 26 and, for example, also to the respective rigid support plate 26. This design allows the width of the vehicle seat 5 to be changed in the retracted and in the expanded state.

In the second exemplary embodiment according to FIGS. 10 and 11, the vehicle seat 5 also has the rigid support plates 26 that can be moved relative to each other, in particular pushed together and apart. A pneumatic cushion 30 is arranged on the respective rigid support plate 26. The respective pneumatic cushion 30 is covered with the respective foam element 28 and with the upholstery fabric 29 arranged thereon. The upholstery fabric 29 is flexibly, in particular stretchably, connected to the respective rigid support plate 26. In this embodiment, gaps can be avoided in the expanded state, as during the pushing apart of the rigid support plates 26, the pneumatic cushions 30 are also inflated and thus expand laterally against each other. This is made possible by the flexible connection of the upholstery fabric 29 to the rigid support plates 26. While the rigid support plates 26 are being pushed together, the air or gas is again at least partially released from the pneumatic cushions 30. This embodiment also allows the width of the vehicle seat 5 to be changed in the retracted and expanded state.

Furthermore, a transparent LCD display on which content can be displayed can be provided in the sunroof as a component with changeable properties. Alternatively, an LED film with diffused glass and a fabric cover can be arranged in the roof liner, on which film individual content corresponding to the selected appearance can also be displayed.

Figure 12:
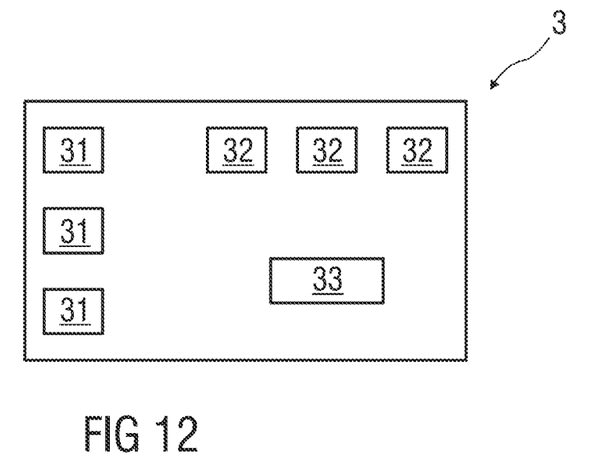

FIG. 12 shows an example of a display of the user platform on the user terminal 3. This is shown here by way of example on the user terminal 3. Alternatively, it is also possible for this user platform to be displayed directly on a display device located in the vehicle 2 and operated there by the user.

In the example shown, three pictograms 31 are displayed on the left, whereby the available appearances are displayed, for example, by clicking on the upper pictogram 31. In the example shown, three different appearances are displayed by means of three selection pictograms 32. By clicking on one of these selection pictograms 32, the respective appearance can be selected. If submenus are available in which additional selection options for designing the respective appearance are offered, these are now also displayed as selection pictograms 32 and one of these selection pictograms 32 can be clicked on again. Once the selection of the respective appearance has been completed in this way, clicking on a confirmation pictogram 33 can cause this appearance to be generated on the user's vehicle 2 in the manner described above.

In addition to the examples described above, it is possible to integrate a function into the user terminal which makes use of augmented technology and, when the user passes over certain components or regions of their vehicle, indicates to the user which changes to these components or function would be possible that they can already integrate in their vehicle 2, optionally accounting for the appearance that they have selected.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A system for changing an appearance of at least one vehicle, the system comprising:
 a vehicle; and
 a vehicle-external server,
  wherein the vehicle comprises
   a plurality of components or functions with changeable properties;

a control unit configured to change the appearance properties of the plurality of components or functions; and a vehicle communication unit configured to at least temporary transmit data between the vehicle and the vehicle-external server, wherein the vehicle-external server comprises a server communication unit configured to at least temporary transmit data between the vehicle-external server and the vehicle or between the vehicle-external server a user terminal;

a user platform accessible from the vehicle or by the user terminal and on which an appearance is selectable from a plurality of appearances available to the vehicle;

a computing unit configured to generate a data packet base on the selected appearance, wherein the data packet is configured for processing in the control unit in the vehicle to change the properties of the plurality of components or functions in a coordinated manner, wherein the vehicle communication unit and the server communication unit are configured to transmit the data packet from the vehicle-external server to the control unit, and wherein the control unit of the vehicle is configured to process the data packet and to adjust the properties of the plurality of components or functions by changing a color of at least one of the plurality of components, wherein the at least one of the plurality of components is an outer skin of the vehicle, an external mirror of the vehicle, or a rim of the vehicle.

2. The system of claim 1, wherein the data packet is software, an activation code for activating specific software modules in the control unit of the vehicle, or a parameter set for processing in at least one software module in the control unit of the vehicle.

3. The system of claim 1, wherein the computing unit on the vehicle-external server is configured to determine, as a function of the selected appearance, the set of components or functions whose properties are changeable, and the number of components or functions of the set of components or functions whose properties are changeable that are present in the vehicle, and the computing unit on the vehicle-external server is configured to generate the data packet as a function of the selected appearance, the set of components or functions whose properties are changeable, and the number of components or functions of the set of components or functions whose properties are changeable that are present in the vehicle.

4. The system of claim 1, wherein the components or functions of the vehicle having changeable properties are:
   at least one interior light,
   at least one headlight,
   at least one changeable film,
   at least one vehicle seat,
   at least one headrest,
   at least one roof liner or a sunroof with lighting elements,
   at least one region of an outer skin,
   at least one door sill,
   at least one external lighting projection,
   at least one hologram in the interior of the vehicle,
   at least one morphable component,
   at least one electronic paper,
   at least one display in an interior of the vehicle,
   at least one sound playback system,
   at least one decorative component,
   at least one rim, in particular at least one rim ring,
   at least one manufacturer's emblem,
   a radiator grille,
   a radiator grille light,
   a front splitter,
   a front panel,
   a rear panel,
   at least one wing mirror, in particular at least one wing mirror cover,
   at least one side skirt,
   at least one vehicle front component,
   at least one vehicle rear component,
   at least one vehicle side component,
   at least one aerodynamic component,
   at least one tail-light,
   at least one physical or virtual control element,
   a dashboard,
   at least one footwell light,
   a windscreen,
   a steering wheel,
   at least one air intake frame, or
   at least one virtual artwork.

5. A system for changing an appearance of at least one vehicle, the system comprising:
   a vehicle; and
   a vehicle-external server,
      wherein the vehicle comprises
         a plurality of components or functions with changeable properties;
         a control unit configured to change the appearance properties of the plurality of components or functions; and
         a vehicle communication unit configured to at least temporary transmit data between the vehicle and the vehicle-external server,
      wherein the vehicle-external server comprises
         a server communication unit configured to at least temporary transmit data between the vehicle-external server and the vehicle or between the vehicle-external server a user terminal;
         a user platform accessible from the vehicle or by the user terminal and on which an appearance is selectable from a plurality of appearances available to the vehicle;
         a computing unit configured to generate a data packet base on the selected appearance, wherein the data packet is configured for processing in the control unit in the vehicle to change the properties of the plurality of components or functions in a coordinated manner,
      wherein the vehicle communication unit and the server communication unit are configured to transmit the data packet from the vehicle-external server to the control unit,
      wherein the control unit of the vehicle is configured to process the data packet and to adjust the properties of the plurality of components or functions, and
      wherein the changeable property of the at least one vehicle seat is a width of the at least one vehicle seat.

6. The system of claim 4, wherein the change in an external appearance of the vehicle comprises at least one constant change or at least one dynamic change.

7. The system of claim 6, wherein the at least one constant change comprises:
   a change in a shape or surface structure of the at least one component;

a projection of a logo, image, or video onto a roadway in a vicinity of the vehicle; or a change in a shape or softness of the at least one vehicle seat.

8. The system of claim 6, wherein the at least one dynamic change comprises:

a reproduction of a changeable content on the at least one electronic paper;

a reproduction of motifs on at least one display unit of the vehicle;

a sequence of a welcome ritual to welcome the user by the vehicle;

a change of a headlight, a reproduction of pulsating or other dynamic light sequences;

change of interior ambient lighting in combination with sound playback.

9. The system of claim 1, wherein the vehicle seat includes pneumatic cushions that are inflatable or deflatable to change a width or a length of the vehicle seat or the vehicle seat includes rigid plates that are moveable relative to each other to change a width or length of the seat.

10. The system of claim 1, wherein the outer skin, the external mirror, or the rim includes electronic paper configured to change colors.

11. A method for changing the appearance of a vehicle, the method comprising:

determining, by a computing unit of a vehicle-external server, which components or functions with changeable properties the vehicle has;

offering a user a choice of a plurality of appearances available for the vehicle via a user terminal;

receiving a user selection of one of the plurality of appearances;

creating data packet as a function of the determined components or functions with changeable properties of the vehicle and as a function of selected one of the plurality of appearances;

transmitting, from the computing unit of the vehicle-external server to the vehicle, the data packet; and controlling, by a control unit of the vehicle, the components or functions of the vehicle so that the components or functions of the vehicle coordinated with one another to produce the appearance of the vehicle selected by the user, wherein the change of the appearance comprises changing a color of at least one of the plurality of components, wherein the at least one of the plurality of components is an outer skin of the vehicle, an external mirror of the vehicle, or a rim of the vehicle, or changing a width or length of a seat of the vehicle.

12. The method of claim 11, wherein the change of the appearance comprises changing a width or a length of the seat of the vehicle by supplying fluid to a pneumatic cushion of the vehicle seat or adjusting a position rigid support plates relative to each other.

13. The method of claim 11, wherein the change of the appearance comprises changing the color of the outer skin of the vehicle, the external mirror of the vehicle, or the rim of the vehicle, wherein the change of color is achieved using digital paper applied to the outer skin, the external mirror, or the rim, respectively.

* * * * *